US007971046B2

United States Patent
Månsson et al.

(10) Patent No.: US 7,971,046 B2
(45) Date of Patent: Jun. 28, 2011

(54) METHOD AND DEVICE FOR INITIALIZING A BOOTING PROCEDURE OF A MOBILE DEVICE

(75) Inventors: Staffan Månsson, Akarp (SE); Lennart Wegelid, BJärred (SE); Rowan Nigel Naylor, Basingstoke (GB)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 819 days.

(21) Appl. No.: 11/813,788

(22) PCT Filed: Feb. 18, 2005

(86) PCT No.: PCT/EP2005/013767
§ 371 (c)(1),
(2), (4) Date: Jan. 31, 2008

(87) PCT Pub. No.: WO2006/074793
PCT Pub. Date: Jul. 20, 2006

(65) Prior Publication Data
US 2008/0200206 A1    Aug. 21, 2008

Related U.S. Application Data

(60) Provisional application No. 60/644,400, filed on Jan. 14, 2005.

(30) Foreign Application Priority Data

Feb. 18, 2005 (EP) .................................... 05003505

(51) Int. Cl.
G06F 9/00 (2006.01)
G06F 12/00 (2006.01)
G06F 13/00 (2006.01)
G06F 15/177 (2006.01)
(52) U.S. Cl. ................. 713/1; 713/2; 713/100; 711/100
(58) Field of Classification Search .................. 713/1, 2, 713/100; 711/100
See application file for complete search history.

(56) References Cited

U.S. PATENT DOCUMENTS
7,657,696 B2 * 2/2010 Su et al. ......................... 711/103
2008/0294838 A1 * 11/2008 Houston et al. ............... 711/103
* cited by examiner

*Primary Examiner* — Mark Connolly (57) ABSTRACT

A method of initializing a booting procedure of a mobile platform having a certain NAND flash memory. The method comprises sending (304) an initial read command sequence to the NAND flash memory and detecting (305) if the NAND flash memory is responsive to the read command sequence. If the NAND flash memory is responsive to the read command sequence the mobile platform will be configured (306) to interface with the NAND flash memory. If the NAND flash memory is not responsive to the initial read command sequence, the method further comprises sending (307) another read command sequence to the NAND flash memory. The another read command sequence is associated with the initially sent read command sequence. Next, it is detected (308) if the NAND flash memory is responsive to the another read command sequence, and if so the mobile platform will be configured (309) to interface with the NAND flash memory.

31 Claims, 5 Drawing Sheets

METHOD AND DEVICE FOR INITIALIZING A BOOTING PROCEDURE OF A MOBILE DEVICE

CROSS-REFERENCE TO RELATED APPLICATIONS

This application claims priority from and incorporates by reference the entire disclosure of U.S. Provisional Application No. 60/644,400 filed Jan. 14, 2005.

TECHNICAL FIELD OF THE INVENTION

The present invention generally relates to a method and a device for initializing a booting procedure of an electronic device such as a mobile terminal. More specifically, the invention relates to a method, a record carrier, and a device for initializing a booting procedure of a mobile platform device having a certain NAND flash memory device.

DESCRIPTION OF RELATED ART

It is known in the art that a memory device for an existing mobile phone includes a flash memory device for storing a program for controlling the operation and function of the mobile phone and a Random Access Memory (RAM) or the like for executing the program. Traditionally, the flash memory device has been either a NOR-type memory device or a NAND-type memory device. Because of its high capacity, low cost, fast overall performance, long life span, etc. many mobile phone manufacturers are exploring the NAND-type flash memory device for code storage.

The general procedure of starting up or resetting a mobile phone, or any similar electronic device, is known as booting or bootstrap. The purpose of booting is to bring the operating system of the mobile phone into a state of readiness. Booting a mobile phone in the case where the code is stored in a NAND flash memory device, sets certain requirements on the mobile platform device that is implemented in the mobile phone. Since a NAND flash memory device does not support random access of data a NAND flash memory device typically requires a command to be sent that readies the NAND flash memory device to be read. In order to be able to boot a mobile phone a microprocessor therefore normally executes a primary boot code that is embodied on an on-chip ROM of a Base Band ASIC (i.e. the ASIC in the mobile platform device that normally contains the main microcontroller usually together with a set of I/O devices and/or on-chip RAM memories). The primary boot code, which is sometimes also referred to as the bootstrapper, applies a certain read command sequence to the NAND memory device in order to determine the way the NAND memory device requires read commands to appear on a data bus.

It has turned out that different NAND flash memory device models require different read command sequences when reading from the NAND flash memory device. Typically, when booting from a NAND flash memory device it is important for the primary boot code to read from the beginning of a first block of the NAND device (i.e. the beginning of the block where the boot image is stored) in order to access any further information that configures the mobile platform device and hence the mobile phone. When performing these initial read operations, the primary boot code however does not know to which type of read command sequence that the NAND flash memory device is responsive.

It is important to ascertain that the primary boot code always applies the correct read command sequence to the associated NAND memory device. Otherwise, the mobile platform device may be unable to boot from the associated NAND flash memory device and accordingly be unable to start up or reset the mobile phone. So far, NAND flash memory manufacturers have offered relatively few models of NAND flash memories on the market. Furthermore, most of these models have no other way of determining the characteristics of the NAND memory device apart from reading off the manufacturer and/or NAND flash memory device identifier. As a consequence, up to now many mobile phone manufacturers have decided on a certain NAND flash memory device model to use in its different mobile platform devices for further implementation in its various mobile phone products. Based on this they have consequently configured the hardware of the mobile platform device so as to ascertain that the correct command sequence is always sent to the associated NAND flash memory device model when reading from the NAND flash memory device. Examples of NAND flash memory models are e.g. K9F1208U0M and K9F1GXXX0M from SAMSUNG, and TC58DVG02A1 and TC58NVG0S3A from TOSHIBA.

As new models of NAND flash memory devices emerge, these newer models will require different read command sequences. This will set certain requirements on the manufacturers of mobile platform devices that are to be implemented in e.g. mobile phone products. If a plurality of customers have various needs, thereby demanding different NAND-models to be used in association with a specific mobile platform device, this may imply substantial disadvantages in that each mobile platform device must be specifically hardware configured in accordance with each customer's unique demands. This obviously means inflexibility. Furthermore, by hardware configuring each mobile platform device in accordance with each customer's needs the overall manufacturing costs will increase.

It is with respect to these considerations and others that the present invention has been made. The present invention seeks to mitigate, alleviate or eliminate one or more of the above-identified deficiencies in the art and disadvantages singly or in combination. Hence, it would be advantageous to provide an improved device and method that allows for increased flexibility at a lower cost.

SUMMARY OF THE INVENTION

It is an object of the present invention to increase the flexibility for mobile platform devices. It is a related object of the invention to enable for mobile platform devices to utilize a plurality of different memory device models, such as NAND flash memory device models.

According to a first aspect of the invention, the above object is achieved by a method of initializing a booting procedure of a mobile platform device having a certain NAND flash memory device. The method comprises sending a first read command sequence to said NAND flash memory device, and detecting if said NAND flash memory device is responsive to the first read command sequence. If said NAND flash memory device is responsive to the first read command sequence the mobile platform device will be configured to interface with said NAND flash memory device. If said NAND flash memory device is not responsive to the first read command sequence the method further comprises sending a second read command sequence which is associated with the first read command sequence to said NAND flash memory device, and detecting if said NAND flash memory device is responsive to the second read command sequence. If said NAND flash memory device is responsive to the second read command sequence the mobile platform device will be configured to interface with said NAND flash memory device.

Preferably, the first read command sequence comprises a first command and a plurality of address cycles and the second read command sequence is a second command. If so, the second read command sequence may preferably be added to the first read command sequence.

The step of detecting if said NAND flash memory device is responsive to said first read command sequence may further comprise waiting for a first acknowledgement notification to be issued by said NAND flash memory device within a pre-determined time, and if issued detecting said first acknowledgement notification. The first acknowledgement notification is issued when said NAND flash memory device is responsive to said first read command sequence. Furthermore, the first acknowledgement notification may be a busy signal. Preferably the predetermined time is in the range of 10-25 μs.

Furthermore, the step of detecting if said NAND flash memory device is responsive to said second read command sequence may further comprise waiting for a second acknowledgement notification to be issued by said NAND flash memory device within a predetermined time, and if issued detecting the second acknowledgement notification. The second acknowledgement notification is issued when said NAND flash memory device is responsive to said second read command sequence. Furthermore, the second acknowledgement notification may be a busy signal. Also, preferably said predetermined time is in the range of 10-25 μs.

Yet further, the method may also comprise, after the step of configuring the mobile platform device, the further step of booting from said NAND flash memory device in accordance with the read command sequence to which said NAND flash memory device is responsive.

Moreover, the method may also comprise, before sending the first read command sequence, resetting said NAND flash memory device.

According to a second aspect of the invention, the above object is achieved by a record carrier having embodied thereon a computer program for processing by a microprocessor, wherein the computer program comprises a code segment for performing the method according the first aspect of the invention. The record carrier may preferably be a Read Only Memory device.

According to a third aspect of the invention, the above object is achieved by a device for performing the method according to the first aspect of the invention. More specifically, the above object is achieved by a device for initializing a booting procedure of a mobile platform device having a certain NAND flash memory device. The device comprises sending means for sending a first and second read command sequence to said NAND flash memory device, wherein said second read command sequence is also associated with said first read command sequence. The device further comprises detecting means for detecting if said NAND flash memory device is responsive to either of the first or second read command sequence. Yet further, the sending means is adapted to configure the mobile platform device to interface with said NAND flash memory device in accordance with the read command sequence to which it is responsive.

The sending means may also be adapted to send the first and second read command sequences via a NAND interface circuit.

Preferably, but not necessarily, the first read command sequence comprises a first command and a plurality of address cycles and the second read command sequence is a second command. If so, the second read command sequence may preferably be added to the first read command sequence.

Furthermore, the detecting means may also be configured to wait for an acknowledgement notification, for a pre-determined period of time, to be issued by said NAND flash memory device. The acknowledgement notification is issued when said NAND flash memory device is responsive to the read command sequence that is sent. The detecting means may also sample for the acknowledgement notification during the pre-determined period of time, and if the acknowledgement notification is issued it is further capable of detecting the acknowledgement notification. The acknowledgement notification may for example be a busy signal.

The sending means could preferably also be adapted to send a reset command to said NAND flash memory device.

Also, the device according to the third aspect of the invention could preferably be an application specific integrated circuit device (ASIC) such as a baseband ASIC.

Yet further, the sending means may preferably be a bootstrapper. Also, the bootstrapper may be incorporated in the NAND interface circuit.

Moreover, the detecting means may be a microprocessor.

According to a fourth aspect of the invention, the above object is achieved by a mobile platform device comprising a NAND flash memory device, a databus and a device according to the third aspect of the invention. The device according to the third aspect of the invention is interconnected with the NAND flash memory device, and the databus. The mobile platform device could for example be incorporated in an electronic device. The mobile platform device may e.g. be incorporated in a mobile terminal such as a mobile telephone.

It is an advantage with the invention that it increases the flexibility for mobile platform devices without having to modifying the mobile platform device, e.g. by configuring the hardware of the mobile platform device. It is a further advantage that there is no need for reading off the ID of the associated NAND flash memory device prior to the booting procedure. Yet a further advantage with the invention is reduced costs. Thus, in comparison with prior art the present invention is cheap. Providing a mobile platform device that is flexible also has the advantage of being able utilize a plurality of different memory devices in association with a specific mobile platform device. This in turn has the further advantage of attracting a variety of different customers having various needs.

It should be emphasized that the term "comprises/comprising" when used throughout this specification and claims is taken to specify the presence of stated features, integers, steps or components but does not preclude the presence or addition of one or more other features, integers, steps, components or groups thereof. In addition, singular references do not exclude a plurality. The terms "a", "an", "first", "second", etc. do not preclude a plurality.

BRIEF DESCRIPTION OF THE DRAWINGS

The present invention will now be described in more detail with reference to the accompanying drawings, in which.

DETAILED DESCRIPTION OF A PREFERRED EMBODIMENT

A preferred embodiment of the invention will now be described hereinbelow with reference to the accompanying drawings, and which shows an exemplary embodiment by which the present invention may be practiced.

Figure 1:
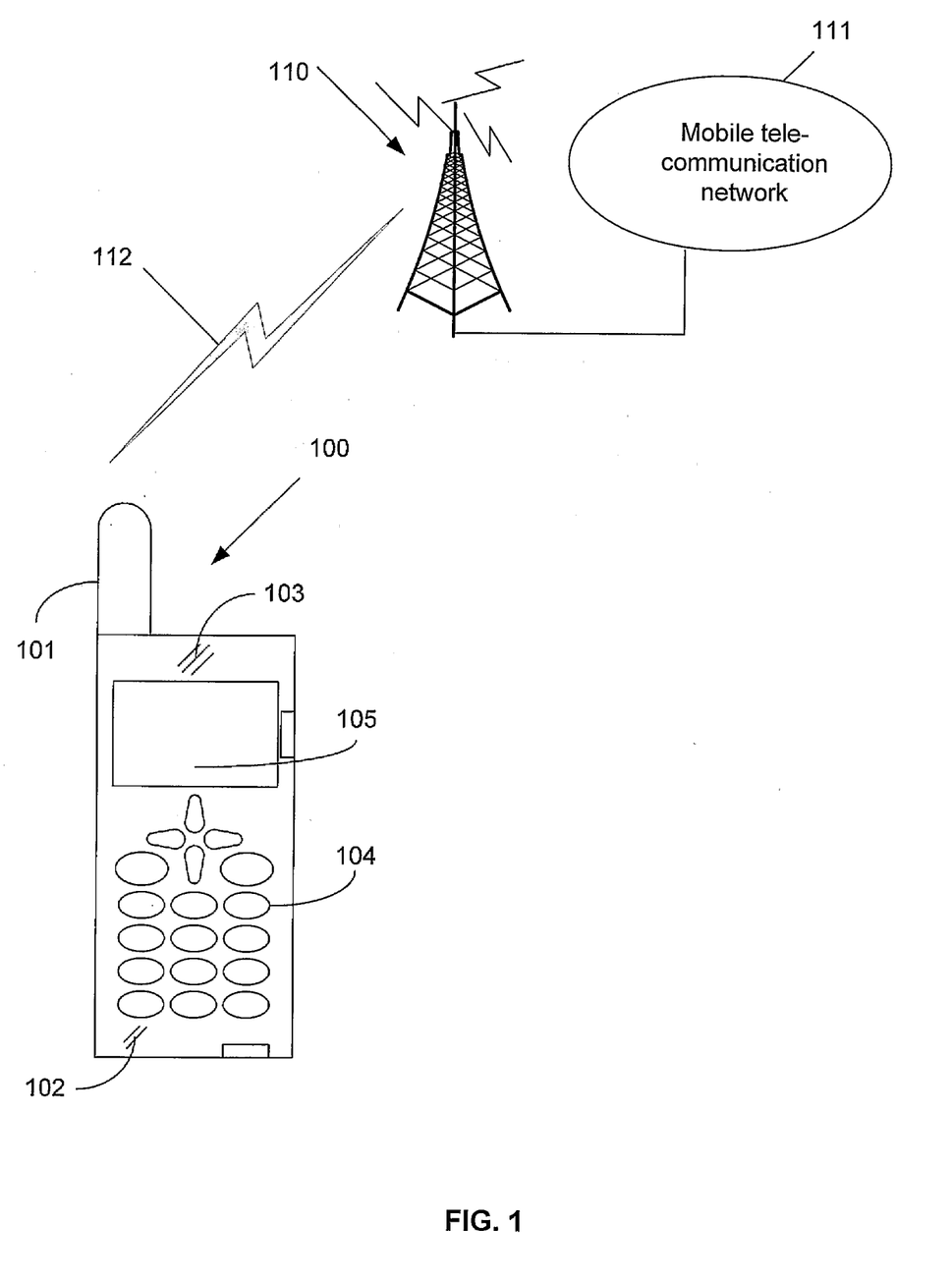
FIG. 1 shows a mobile terminal in which the present invention could be practiced and a mobile telecommunication network in which the mobile terminal may operate.

FIG. 1 illustrates a mobile terminal 100, in the form of a mobile telephone, as one exemplifying electronic device in which the mobile platform device according to the invention may be advantageously provided. It also shows a possible environment in which the mobile terminal 100 may operate. The mobile terminal 100 may comprise an antenna 101. A microphone 102, a loudspeaker 103, a keypad 104, and a display 105 provide a man-machine interface for operating the mobile terminal 100. The mobile terminal 100 may in operation be connected to a radio station 110 (base station) of a mobile communication network 111 such as GSM, UMTS, PCS, and/or DCS network, via a first radio link 112 by means of the antenna 101. The mobile terminal 100 may also comprise a DSP, a transceiver, etc.

It should be noted that the term "mobile terminal" when used hereinafter includes all devices such as mobile telephones, portable radio communication equipments, smartphones or the like.

Figure 2:
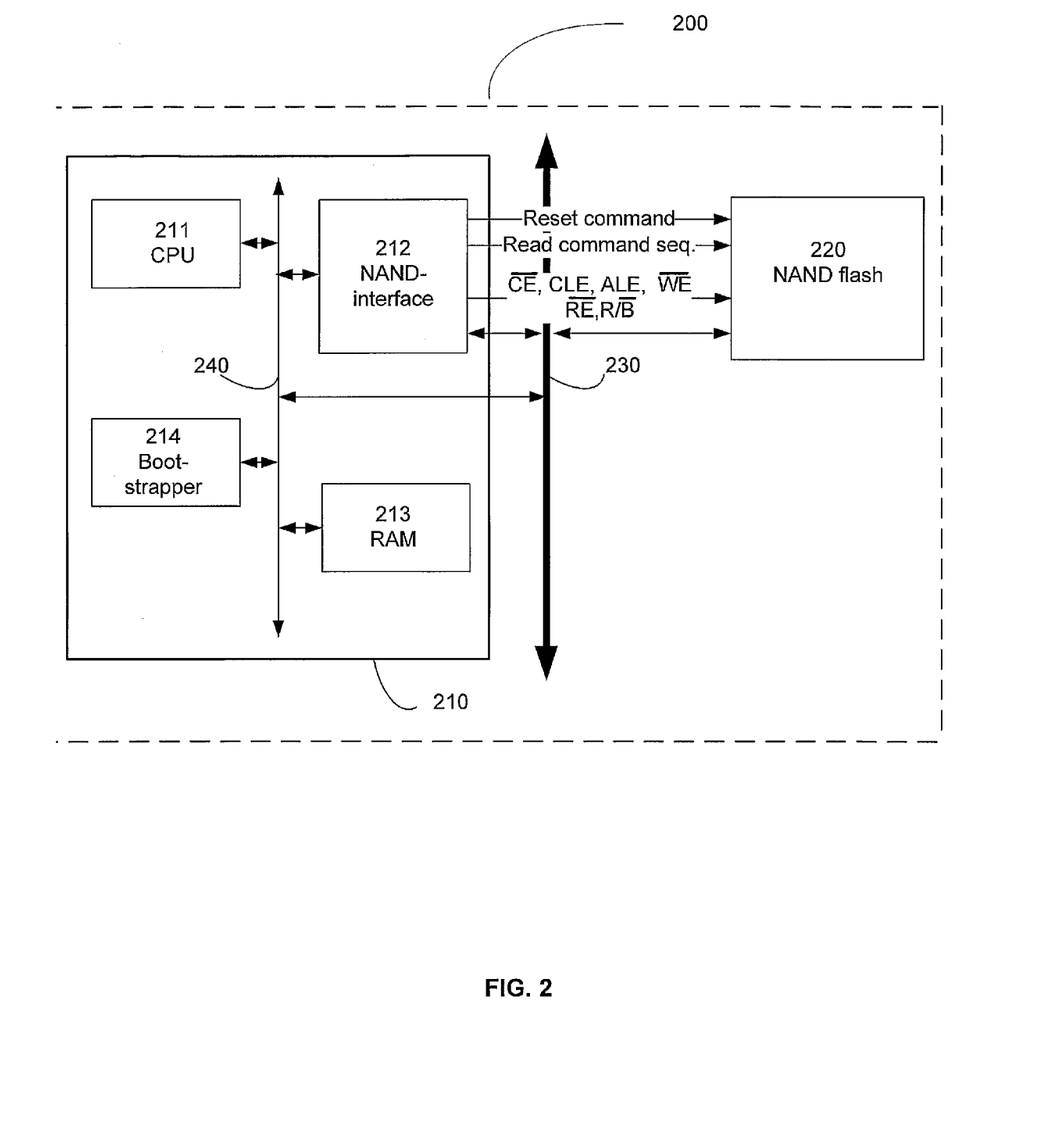
FIG. 2 shows a block diagram of a first embodiment of a mobile platform device utilizing an associated NAND flash memory device.

An exemplary mobile platform device 200 according to a first embodiment is illustrated in FIG. 2. The mobile platform device 200 is adapted to be incorporated in a mobile terminal 100 according to FIG. 1 and further has an associated NAND flash memory device 220 for storing a program for controlling the operation and function of the mobile terminal 100.

The mobile platform device 200 comprises an application specific integrated circuit (ASIC) device 210, such as a baseband ASIC, and a NAND flash memory device 220. The mobile platform device 200 further comprises an external databus 230 for transferring of data between the ASIC 210, and the NAND flash memory device 220. In this embodiment, the mobile platform device 200 comprises components of a mobile platform device 200 that is booted by an initializing program. Such initializing program is commonly referred to as a boot code. It is to be understood that according to alternative embodiments a mobile platform device may comprise alternative components than those shown in FIG. 2. The components shown, however, are sufficient to disclose an illustrative embodiment for practicing the present invention.

The ASIC device 210 may comprise a microprocessor (CPU) 211, a NAND interface circuit 212, a RAM 213, a bootstrapper 214 and an internal databus 240 interconnecting the components for transferring data therebetween. The ASIC is preferably, but not necessarily, embodied on a single semiconductor chip and it generally manages any associated memory such as the NAND flash memory device 220, which is connected to the ASIC 210 through the external databus 230.

The NAND flash memory device 220 is organized in a set of blocks that in turn is divided into a set of pages. Typically, but not necessarily, blocks are of size 16 or 64 kB and pages have a size of 512 or 2048 bytes. Reading, writing, and erasing data in the NAND memory device 220 is normally performed by means of the CPU 211 issuing a command followed by two, three, four, five and possibly more address cycles and then optionally transferring the data (i.e. when reading/writing data). The number of required address cycles is model specific and depends on the memory size and/or organization of the NAND flash memory device used. Furthermore, the NAND flash memory device is typically equipped with for example 8 or 16 I/O-pins and also a number of control pins (such as CLE, CE, WE, ALE, RE) and status pins, such as e.g. busy pin, for connection to the NAND interface 212. Some of the pins are only used for commands and status information whereas others are only used for data transfers. Blocks in a NAND flash memory device may be invalid or "bad" and therefore it may be preferred to implement some kind of bad block management. The very first block, which is located on the 0x00 block address, is normally fully guaranteed to be a valid block and hence does not require Error Correction. This makes the first block of a NAND flash memory device suitable for storing the boot image, i.e. an exact copy of the boot code necessary for booting of the mobile platform device 200 and which exact copy of the boot code is to be placed (copied) into the RAM 213. Accordingly, the boot image is preferably stored from the beginning of the first block of the NAND memory device. It may also be restricted to fit within this first block. In addition, the NAND flash memory device 220 may also store an operating system (OS) and application programs for controlling the operation and function of the mobile terminal 100, and may also be used as a user data storing area during the operation of the mobile terminal 100.

Referring to the ASIC 210 of FIG. 2, the CPU 211 is adapted to execute the OS, applications and operation programs. During the very first initialization operations the CPU 211 is also adapted to execute the necessary primary boot code that is stored in the bootstrapper 214. The CPU 211 will thus provide the overall control of the mobile terminal so as to perform the functions inherent in the mobile terminal 100. The internal databus 240 transfers data to and from the CPU 211 and between the NAND interface 212, the RAM 213, and the bootstrapper 214.

The RAM 213 is preferably a Random Access Memory (RAM). Upon initializing of a booting procedure the necessary boot code that is first stored in the NAND flash memory device 220 will eventually be transferred to the internal RAM 213. After transfer of the boot code is completed, the boot code can be executed therefrom by means of the CPU 211. The boot code, when executed by the CPU 211 initializes the ASIC 210, the NAND flash memory device 220, and any further peripheral devices.

Upon initializing, i.e. in response to a mobile platform device initializing signal, the bootstrapper 214 is adapted to perform the very first initialization operations of the booting procedure. Accordingly, the bootstrapper 214 includes the necessary primary boot code that is responsible for the very first initialization operations of the mobile platform device 200. The primary boot code is accordingly adapted to interpret or load and execute the boot image of the NAND flash memory device 220. In response to a mobile platform device initializing signal the primary boot code stored in the bootstrapper 214 will thus be executed by means of the CPU 211.

The ASIC 210 is also provided with a NAND interface circuit 212 in order to interface with the associated NAND flash memory device 220. This is done by loading each command and address on an external databus 230. The NAND interface circuit 212 may optionally also perform an error control function that may be required during NAND interfacing.

Figure 3:
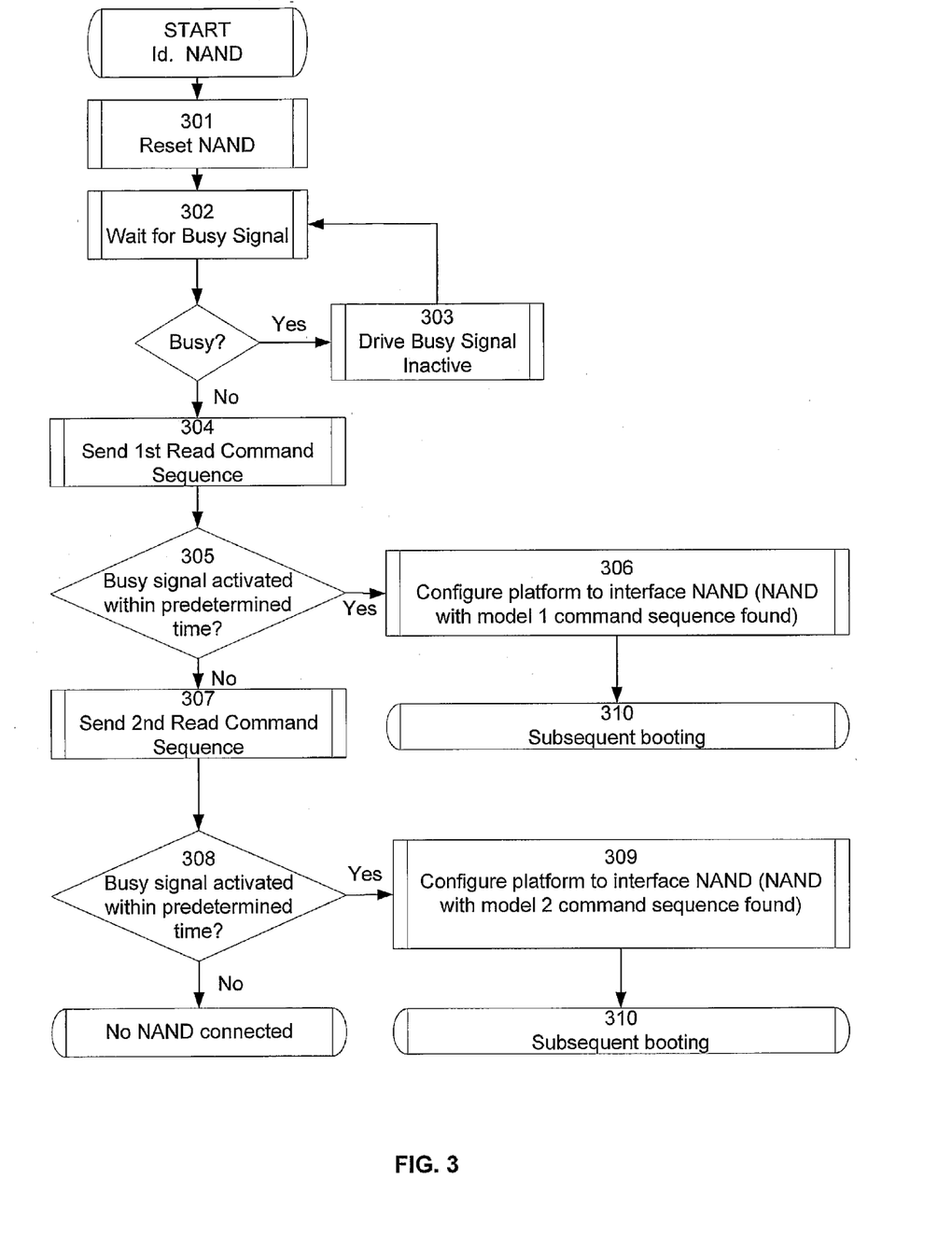
FIG. 3 shows a flowchart illustrating a method according to a first embodiment of the invention of distinguishing between two different NAND flash memory device models.

A method of initializing a booting procedure of a mobile platform device 200 having a NAND flash memory device 220 according to the first embodiment will be described in detail hereinbelow with reference to FIGS. 2 and 3. According to this embodiment, the boot code is pre-stored (in advance) in the NAND flash memory device 220 that is to be incorporated in the mobile platform device 200. Furthermore, characteristics information (such as page size, block size, etc.) pertaining to the associated NAND memory device 220 is integrated into the NAND flash memory device 220. The characteristics information is model specific for the NAND flash memory device 220 and comprises configuration information. Furthermore, the characteristics information is stored in a relatively small area, which is preferably, but not necessarily, less than 0x100 bytes, in the beginning of the first block of the NAND memory device. Yet further, it is possible to read this relatively small area. This can be done in a way that is common to a plurality of NAND flash memory device models. Here common means that it is common except from the fact that different read command sequences are required for different NAND flash memory device models.

Figure 4:
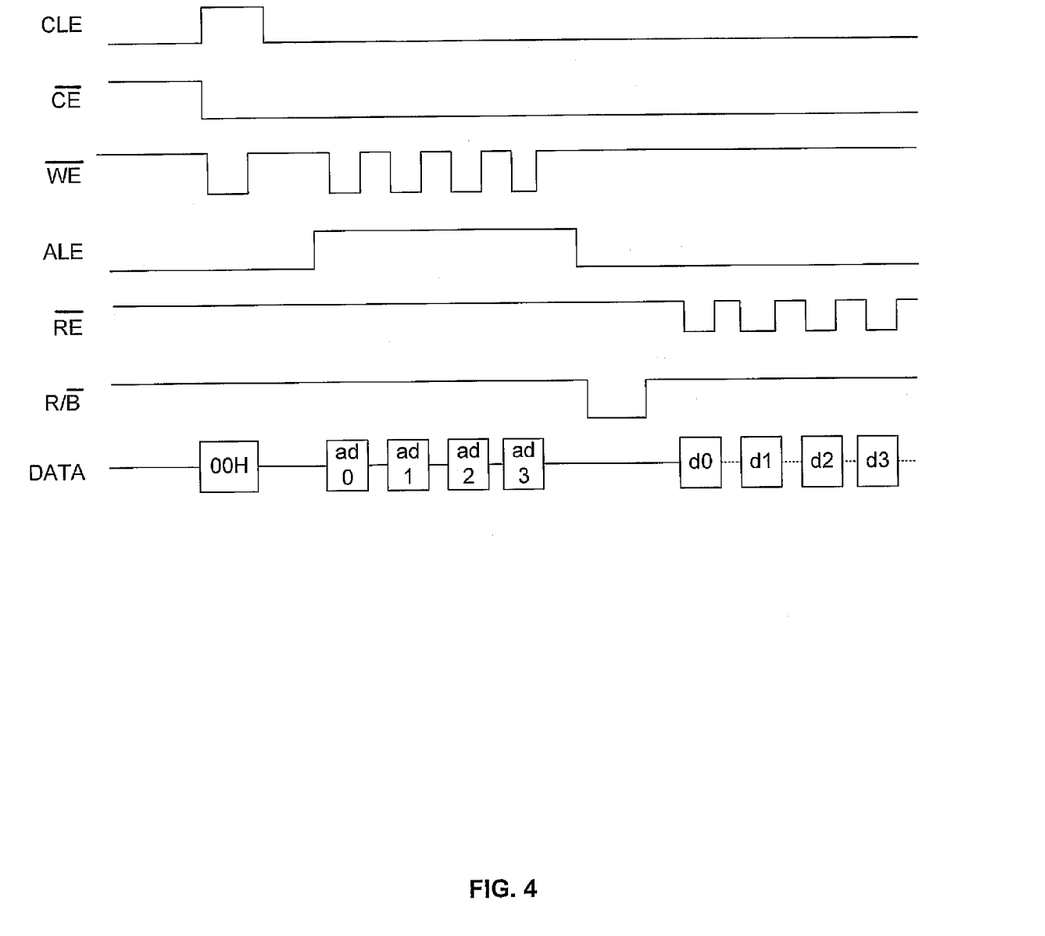
FIG. 4 shows an illustrative timing diagram of a process of transferring boot code from a NAND flash memory device being of NAND1-model.
Figure 5:
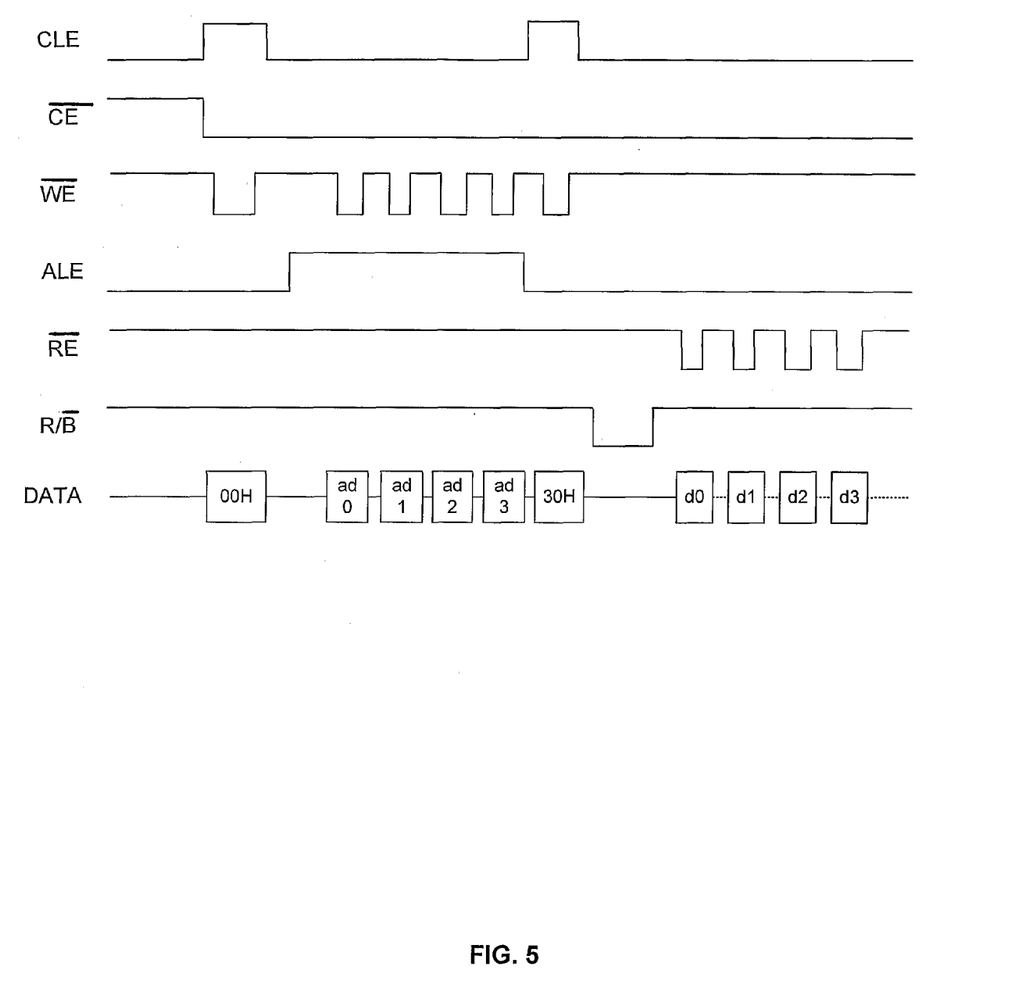
FIG. 5 shows an illustrative timing diagram of a process of transferring boot code from a NAND flash memory device being of NAND2-model.

It is assumed that the associated NAND flash memory device 220 is initially unknown, i.e. upon initializing of the booting procedure. Nevertheless, in the following description it will also be assumed that the NAND flash memory device 220 connected with the ASIC 210 in the mobile platform device 200 is either of two different NAND-models, NAND1-model or NAND2-model. However, the invention should of course not be construed as limited to these exemplary NAND-models or to only two different models. According to this embodiment, a NAND1-model is a NAND flash memory device model such as the "K9F1208U0M 512 Kb" from SAMSUNG and a NAND2-model is a NAND flash memory device model such as "K9F1G08U0M 1 Gb" from SAMSUNG. NAND flash memory device models which are similar to the NAND1- and NAND2-models above are offered by other manufacturers also (e.g. Toshiba's NAND1: TC58DVG02A1 and NAND2: TC58NVG0S3A). NAND1- and NAND2-models require different read command sequences during a read operation. A difference between the NAND1-model and the NAND2-model is that NAND2-models allow a read command 0x30, whereas this is not the case for NAND1-models. Exemplary read command sequences for NAND1- and NAND2-models are illustrated in FIGS. 4 and 5, respectively. FIG. 4 shows an illustrative timing diagram for a read operation according to NAND1-models and FIG. 5 shows an illustrative timing diagram for a read operation according to NAND2-models. It should be noted that the term "read command sequence" when used in this specification and claims is to be understood as a sequence comprising a read command and N (i.e., 0 . . . n) additional address cycles.

Upon initializing, i.e. in response to a mobile platform device initializing signal, the primary boot code comprised in the bootstrapper 214 will be executed by means of the CPU 211. The mobile platform device initializing signal thus includes a power-up signal (i.e. generated when the mobile platform device is powered up), or a reset signal. Thereafter, in step 301, the associated NAND flash memory device 220 will be set to a known state. Upon execution of the primary boot code stored in the bootstrapper 214 this will be accomplished by sending a reset command 0xFF to the associated NAND flash memory device. Resetting the NAND flash memory device 220 is done in order to reset the mobile platform device 200 and thereby put it into a known state. In the next step, i.e. step 302, the bootstrapper 214 waits for a busy signal, via a busy pin, that is issued by the NAND flash memory device 220 to become inactive, i.e. logic high in this embodiment, meaning that the mobile platform system is reset. In particular, an inactive busy signal means that the busy pin of the NAND flash memory device is or becomes inactive. Moreover, the status of the busy signal can be detected by means of the CPU 211 via the NAND interface 212. Thereby, the CPU 211 is capable of being informed whether the NAND flash memory device 220 has been reset or not. Furthermore, according to this embodiment, if there was no NAND flash memory device connected with the ASIC device 210 the busy pin will be driven inactive, e.g. by an on-chip pull-up. The CPU 211 will consequently be informed that the associated NAND flash memory device 220 is reset (although in practice there was no NAND flash memory device connected). It has turned out that it is good practice to begin with resetting the mobile platform device 200 before proceeding with further method steps.

Next, in step 304, the primary boot code comprised in the bootstrapper is executed by means of the CPU 211 so that an initial read command sequence is sent from the bootstrapper 214, through the NAND-interface circuit 212, to the associated NAND flash memory device 220 assuming that the associated NAND flash memory device is of a NAND1-model, i.e. a NAND flash memory device being responsive to read command sequences in accordance with NAND1-models. In this connection, it is to be noted that the number of required address cycles (following the read command) differs for different NAND models in dependence of their memory size and/or memory organization. The number of required address cycles that must be sent in association with the initial read command sequence therefore depends on the memory size and/or memory organization of the NAND flash memory devices that is to be supported by the mobile platform device. It is to be appreciated that one should allow as many address cycles (adN's) required by the largest NAND flash memory device that one wishes to be supported by a specific mobile platform device. In this exemplary embodiment it is to be understood that the mobile platform device 200 is to support a NAND flash memory device requiring maximum 4 address cycles (ad3) as NAND2-models allow any number (adN's) of address cycles. So, the step of sending the read command sequence, step 304, comprises sending the read command 0x00 followed by four address cycles in the sequence ad0, ad1, ad2, and ad3. In this example, it is to be appreciated that ad0 is 0x00, ad1 is 0x00, ad2 is 0x01, and ad3 is 0x00 in order to check if the associated NAND memory device 220 is of NAND1-model. Preferably, the address, for the addressing modes of both NAND1 and NAND2 (which are to be tested according to this embodiment), should be big enough to be outside the first block of the NAND flash memory device 220 but still small enough to be within the address range of the NAND memory device 220. The reason for the access to an address that is beyond the first block is to avoid a possible and undesired auto-load functionality of the NAND memory device 220, which might prevent the busy signal to be activated if the address of the first page of the NAND flash memory device 220 had been used.

After this, in step 305, it is checked (by means of the CPU 211) whether a busy signal has been issued by means of the NAND flash memory device 220 within a predetermined time. The busy signal is checked (sampled) by means of the CPU until the busy signal is detected or the predetermined time has elapsed. The busy signal is issued by the NAND flash memory device after it responds to the sent initial read command sequence (if it responds) and there may be some delay.

In particular, in this embodiment an issued busy signal means that a busy pin of the NAND flash memory device becomes active. An active busy pin (i.e. logic low) indicates that the NAND flash memory device 220 that is connected to the ASIC 210 is of NAND1-model. This will accordingly be detected by the CPU 211 when the busy signal is issued by means of the connected NAND flash memory device 220. The predetermined time should be long enough to ensure that the busy signal can be issued by the NAND flash memory device 220 prior to the busy signal is sampled by the CPU 211. Moreover, the predetermined time should not be too long as that slows down the procedure of initializing the booting. The predetermined time could e.g. be in the range 10-25 μs. Preferably, the predetermined time is pre-set to approximately 10 μs. It has turned out that it is guaranteed that the NAND flash memory device issues the busy signal (the busy pin goes active) within 10 μs.

So, if an active busy signal is detected by the CPU 211 it is established that a NAND flash memory device 220 is connected to the ASIC 210 and that the NAND flash memory device 220 is of NAND1-model. Accordingly, the NAND flash memory device 220 accepts the sent read command sequence. As a consequence, in step 306, the bootstrapper will be able to configure the mobile platform device 200 to interface with the associated NAND flash memory device 220 as soon as the busy signal has been deactivated (i.e. busy pin has been deactivated). Thereby, also subsequent booting from the connected NAND1 memory device is enabled, since it is now possible to further read out characteristics information from the connected NAND1 memory device. The general principles of a subsequent booting procedure will be described later.

However, if there is no busy signal detected for the sent initial read command sequence it will be concluded that the associated NAND memory device is not of NAND1-model. In step 307, the primary boot code comprised in the bootstrapper will then be further executed by means of the CPU 211 so that another read command sequence is sent to the NAND flash memory device 220. In fact, in this embodiment, the another read command sequence does not necessarily have to comprise a sequence of a read command and one or more address cycles. Rather, in this exemplary embodiment it is sufficient to send a read command 0x30 (read start) as a continuation of the initial read command sequence in order to check if the associated NAND memory device is of NAND2-model. Thus, a read command 0x30 is simply added to the already sent initial read command sequence. Again, it is to be noted that a command 0x30 is not allowed to be issued to NAND1-models. Next, in step 308, it is checked (by means of the CPU 211) whether a busy signal has been issued by means of the NAND flash memory device 220 within a predetermined time in a similar manner as described above. Again, the busy signal is checked (sampled) by means of the CPU until the busy signal is detected or the predetermined time has elapsed. The busy signal is issued by the NAND flash memory device after it responds to the sent another read command sequence (if it responds) and there may be some delay. As previously described, it is good practice to have a predetermined time in the range of 10-25 μs. An active, i.e. logic low, busy signal indicates that there is a NAND flash memory device connected to the ASIC 210. Furthermore, it is established that the connected NAND flash memory device 220 is of NAND2-model, because the NAND flash memory device 220 is responsive to the sent another read command sequence. If an active busy signal (i.e. active busy pin) is detected by the CPU 211, also the bootstrapper 214 will be informed that the connected NAND flash memory device 220 is of NAND2-model. As a consequence the bootstrapper will be able to configure the mobile platform device, in step 309, to function with the connected NAND2-model as soon as the busy signal has been deactivated (i.e. busy pin has been deactivated). Hence, subsequent booting from the connected NAND2 memory device may follow since it is now possible to further read out characteristics information from the connected NAND2 memory device.

According to this example, if there is no busy signal detected in step 308 it will be concluded that there is neither a NAND1-model nor a NAND2-model connected with the ASIC 210. This could mean that there is no NAND memory device 220 at all associated with the mobile platform device 200. It could equally possible mean that a connected memory device is of a type other than NAND1 and NAND2.

The above example has described a method according to a first embodiment by which it is possible to distinguish between two different read command sequences (pertaining to two different NAND-models, i.e. NAND1 and NAND2) when accessing a connected initially unknown NAND memory device.

In further embodiments, the method could include further method steps in order to distinguish between further NAND-models by applying yet further read command sequences. If so, and if any further NAND model would be larger than the described NAND-models the initial read command sequence would have to comprise as many address cycles as required by such larger NAND model (e.g. the initial read command sequence could be 0x00 ad0, ad1, ad2, ad3, ad4 if the such larger NAND-model requires five address cycles). In yet further embodiments, the method could also comprise further steps for trying to boot from non-NAND memory devices. This would mean an even more flexible and cost-effective mobile platform device.

As soon as it has been determined which NAND memory device model (NAND1 or NAND2 or potentially other) that is actually connected to the ASIC 210 a subsequent booting procedure may proceed, because it is then possible to read out further characteristics information relating to the connected NAND flash memory device. The subsequent booting procedure will be performed in accordance with the specific procedure that adheres to the connected NAND-model. Although the booting procedure differs depending on the NAND-model, e.g. with regard to the required read command sequences, the principle is in general similar for most NAND-models. Therefore, the general principle of reading out a boot code stored in a NAND flash memory device 220 by the bootstrapper 214 and transferring the read-out boot code to the RAM 213 will now be described below with reference to FIGS. 2 and 4. This is done in order to provide an outline of the complete booting of a mobile terminal 100.

FIG. 4 shows an illustrative timing diagram of a process of transferring boot code from the NAND flash memory device 220. It is to be assumed that that the connected NAND flash memory device 220 is of a NAND1-model. As soon as it has been established that the connected NAND flash memory device 220 is of a NAND1-model the bootstrapper will be able to further output control signals (e.g. CLE, CE, WE, ALE, R/B, and RE) to read out the boot code that is stored in the boot image of the NAND flash memory device 220. In practice, the bootstrapper 214 controls the control signals more or less directly, via the NAND interface circuit 212, depending on how much the NAND interface circuit 212 automates the NAND operations.

The command latch enable signal CLE is activated when a predetermined command is input to the NAND flash memory device 220. The address latch enable signal ALE is activated when a predetermined address is input to the NAND flash memory device 220.

The NAND flash memory device 220 receives the predetermined read command (in this example 0x00) via the external bus 230 in response to an active, i.e. logic high, command latch enable signal CLE, an active, i.e. logic low, chip enable signal $\overline{CE}$ and an active write enable signal $\overline{WE}$. It is to be understood that here, and in the following "‾" represents an active low state.

Moreover, the NAND flash memory device 220 receives an address via the external bus 230 in response to an active address enable signal ALE, an active chip enable signal $\overline{CE}$, and an active write enable signal $\overline{WE}$.

Upon execution of the primary boot code stored in the bootstrapper 214, the bootstrapper 214 generates the predetermined read command 0x00 to read out the boot code stored in the NAND flash memory device 220. Thereafter it generates the addresses ad0, ad1, ad2 and ad3. Since the connected NAND flash memory device 220 is of NAND1-model this will be detected in accordance with the principles described previously with regard to the first embodiment. Thus, as it is determined that the connected NAND memory device 220 is of NAND1-model it will be possible to further read out the boot code stored in the NAND flash memory device 220. The data read is then temporarily stored in an internal buffer (not shown) of the NAND flash memory device 220.

Upon an active logic, i.e. 'low', of a ready/busy signal R/$\overline{B}$, the copy operation of the data (e.g. the boot code; in this example d0, d1, d2 and d3) to the internal buffer is completed. However, upon an inactive logic, i.e. 'high', of the ready/busy signal R/$\overline{B}$ the copy operation of the data is not completed. Consequently, upon activation of the read enable signal $\overline{RE}$ the data d0 through d3 is transferred to the external databus 230. Then, the data d0, d1, d2, and d3 on the bus 230 are transferred, via the NAND interface circuit 212, to the RAM 213.

The bootstrapper 214 then stores the boot code in the RAM 213. Thereafter, executing the boot code that is loaded into the RAM 213 by means of the CPU 211 causes the different hardware components of the mobile platform device 200 to be initialized. When incorporated into a mobile terminal, the mobile platform device 200 will thus eventually be able to operate and function properly.

The present invention has been described above with reference to a specific embodiment. However, other embodiments than the above are equally possible within the scope of the invention. For example, the present invention may be embodied in many different forms and should not be construed as limited to the embodiment set forth herein. Rather, the embodiment is provided so that the disclosure will be thorough and complete, and will fully convey the scope of the invention to those skilled in the art. Among other things, the present invention may be embodied as methods or devices. Consequently, the present invention may take the form of an entirely hardware embodiment, an entirely software embodiment or an embodiment combining software and hardware aspects. The description should therefore not be taken in a limiting sense. Furthermore, although the present invention has been specifically described with reference to mobile terminals, it should be appreciated that the invention could be practiced in any electronic device (e.g. electronic organizers such as personal digital assistants, pagers, etc.), which utilizes a NAND flash memory device to boot from. Furthermore, although the present invention has been described for NAND flash memory devices it should nevertheless also be understood that the invention could potentially also be applicable to other memory devices. Yet further, it is possible to incorporate the bootstrapper 214 into the NAND-interface 212. Furthermore, it is possible to include one or more additional internal RAM memory devices in the ASIC device. Different method steps than those described above, performing the method by hardware or software, may be provided within the scope of the invention. Yet further, the different features and steps of the invention may be combined in other combinations than those described. The invention is only limited by the appended claims.

The invention claimed is:

1. A method of initializing a booting procedure of a mobile platform device having a certain NAND flash memory device comprising the steps of:
   sending a first read command sequence to said NAND flash memory device;
   detecting if said NAND flash memory device is responsive to the first read command sequence and if so, configuring the mobile platform device to interface with said NAND flash memory device;
   otherwise sending a second read command sequence which is associated with the first read command sequence to said NAND flash memory device; and
   detecting if said NAND flash memory device is responsive to the second read command sequence, and if so, configuring the mobile platform device to interface with said NAND flash memory device.

2. The method according to claim 1, wherein said first read command sequence comprises a first command and a plurality of address cycles.

3. The method according to claim 1, wherein said second read command sequence is a second command.

4. The method according to claim 3, wherein the second read command sequence is added to the first read command sequence.

5. The method according to claim 1, wherein the step of detecting if said NAND flash memory device is responsive to said first read command sequence further comprises the steps of:
   waiting for a first acknowledgement notification to be issued by said NAND flash memory device within a predetermined time, said first acknowledgement notification being issued when said NAND flash memory device is responsive to said first read command sequence; and
   if issued, detecting the first acknowledgement notification.

6. The method according to claim 5, wherein the first acknowledgement notification is a busy signal.

7. The method according to claim 5, wherein the predetermined time is in the range of 10-25 microseconds.

8. The method according to claim 1, wherein the step of detecting if said NAND flash memory device is responsive to said second read command sequence further comprises the steps of:
   waiting for a second acknowledgement notification to be issued by said NAND flash memory device within a predetermined time, said second acknowledgement notification being issued when said NAND flash memory device is responsive to said second read command sequence; and
   if issued, detecting the second acknowledgement notification.

9. The method according to claim 8, wherein the second acknowledgement notification is a busy signal.

10. The method according to claim 8, wherein the predetermined time is in the range of 10-25 microseconds.

11. The method according to claim 1, further comprising, after the step of configuring the mobile platform device, the further step of booting from said NAND flash memory device in accordance with the read command sequence to which said NAND flash memory device is responsive.

12. The method according to claim 1, further comprising, before sending the first read command sequence, the step of resetting said NAND flash memory device.

13. A non-transitory record carrier having embodied thereon a computer program for processing by a microprocessor, the computer program comprising a code segment for initializing a booting procedure of a mobile platform device having a certain NAND flash memory device, the computer program adapted to:
  send a first read command sequence to said NAND flash memory device;
  detect if said NAND flash memory device is responsive to the first read command sequence and if so, configure the mobile platform device to interface with said NAND flash memory device;
  otherwise, send a second read command sequence which is associated with the first read command sequence to said NAND flash memory device; and
  detect if said NAND flash memory device is responsive to the second read command sequence and if so, configure the mobile platform device to interface with said NAND flash memory device.

14. The record carrier according to claim 13, wherein the record carrier is a Read Only Memory device.

15. A device for initializing a booting procedure of a mobile platform device having a certain NAND flash memory device, comprising:
  means for sending a first and second read command sequence to said NAND flash memory device, wherein said second read command sequence is associated with said first read command sequence; and
  means for detecting if said NAND flash memory device is responsive to either of the first or second read command sequence;
  wherein the means for sending is further adapted to configure the mobile platform device to interface with said NAND flash memory device in accordance with the read command sequence to which it is responsive.

16. The device according to claim 15, wherein said means for sending is adapted to send the first and second read command sequences via a NAND interface circuit.

17. The device according to claim 15, wherein said first read command sequence comprises a first command and a plurality of address cycles.

18. The device according to claim 15, wherein said second command sequence is a second command.

19. The device according to claim 15, wherein the second command sequence is added to the first read command sequence.

20. The device according to claim 15, wherein the means for detecting is further configured to:
  wait for an acknowledgement notification for a pre-determined period of time to be issued by said NAND flash memory device, said acknowledgement notification being issued when said NAND flash memory device is responsive to the read command sequence that is sent;
  sample for the acknowledgement notification during the pre-determined period of time; and
  if the acknowledgement notification is issued, detect the acknowledgement notification.

21. A device according to claim 20, wherein the acknowledgement notification is a busy signal.

22. The device according to claim 15, wherein the means for sending is further adapted to send a reset command to said NAND flash memory device.

23. The device according to claim 15, wherein the device is an application specific integrated circuit device.

24. The device according to claim 23, wherein the application specific integrated circuit device is a baseband application specific integrated circuit device.

25. The device according to claim 15, wherein the means for sending is a bootstrapper.

26. The device according to claim 25, wherein the bootstrapper is incorporated in the NAND interface circuit.

27. The device according to claim 15, wherein the means for detecting is a microprocessor.

28. The device according to claim 15, further comprising a mobile platform device having a NAND flash memory device.

29. The device according to claim 28, wherein the mobile platform device is incorporated in an electronic device.

30. The device according to claim 29, wherein the electronic device is a mobile terminal.

31. The device according to claim 30, wherein the mobile terminal is a mobile telephone.

* * * * *